July 20, 1965 SVEN A. SIEURIN 3,195,964
ANTI-FRICTION BEARINGS
Filed Sept. 5, 1961
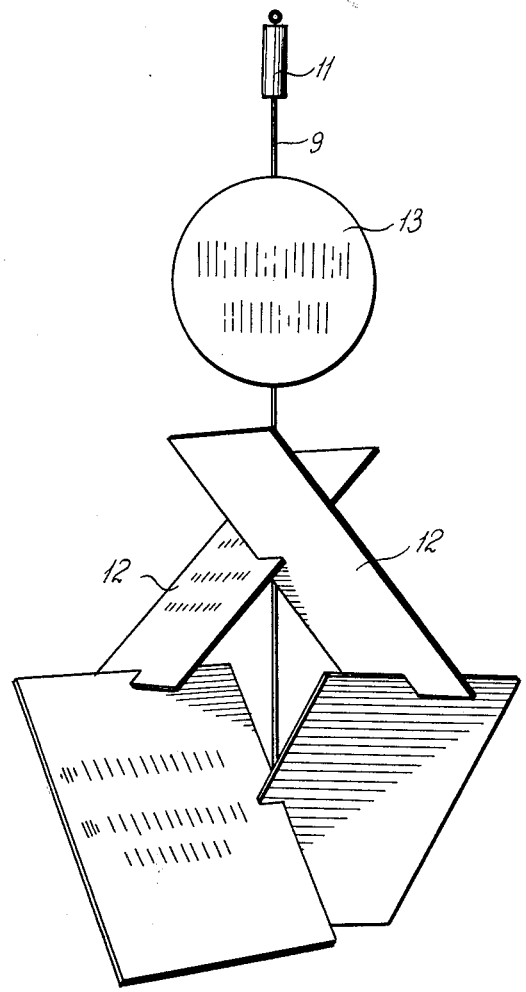
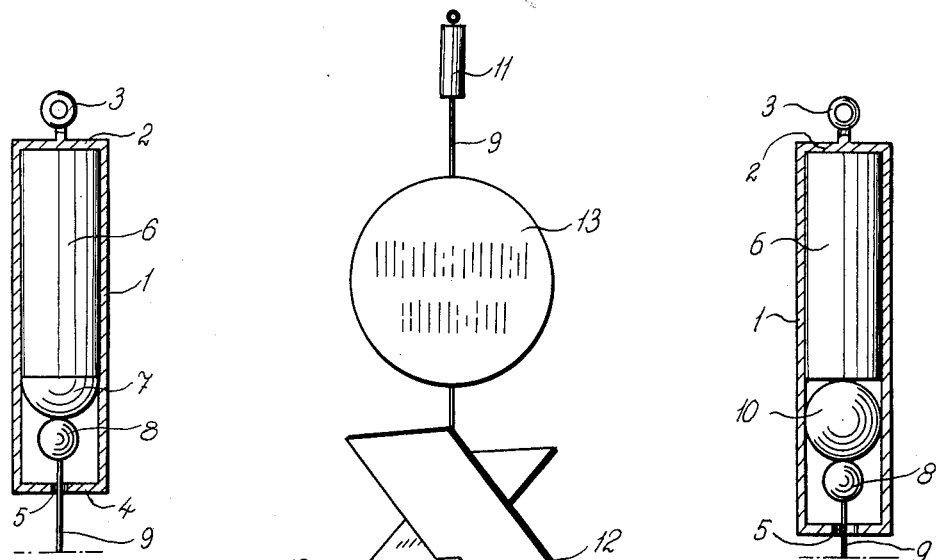
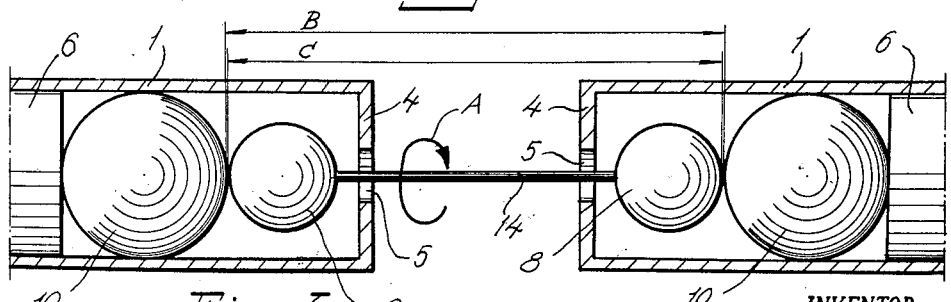
INVENTOR.
Sven Arne Sieurin
BY
Stevens, Davis, Miller & Mosher
Attorneys

United States Patent Office 3,195,964
Patented July 20, 1965

3,195,964
ANTI-FRICTION BEARINGS
Sven Arne Sieurin, Gjorwellsgatan 14, Stockholm, Sweden
Filed Sept. 5, 1961, Ser. No. 135,976
Claims priority, application Sweden, Sept. 7, 1960,
8,513/60
1 Claim. (Cl. 308—10)

The present invention relates to anti-friction bearings.

The general object of the invention is to provide a magnetic anti-friction bearing which is self-centering and has the ability of adjusting itself and maintaining a definite axis of rotation.

The invention consists in an anti-friction bearing of the kind which comprises at least two mutually turnable members which attract each other by magnetic forces, wherein the mutually turnable members have convex surfaces which engage each other.

The invention also consists in an anti-friction bearing arrangement comprising two anti-friction bearings according to the invention, wherein both said bearings carry a common shaft in such a way that the shaft is kept floatingly mounted between them.

The invention further consists in an illuminating, lighting or publicity display arrangement which is suspended from an anti-friction bearing according to the invention, wherein the load on the bearing is at least partially constituted by projecting members which may impart rotational movement, to the arrangement by means of weak gas or liquid streams impinging thereon.

The invention will now be described by way of example only, with reference to the accompanying drawing, in which:

FIGURE 1 is a longitudinal section of a preferred embodiment of a magnetic anti-friction bearing, FIGURE 2 is a longitudinal section of a modified embodiment of the bearing shown in FIGURE 1, FIGURE 3 represents a publicity display or lighting arrangement suspended from an anti-friction bearing, and FIGURE 4 shows a suspension of a horizontal shaft from two anti-friction bearings.

Referring firstly to FIGURE 1 the bearing casing constituted by a tubular sleeve 1, serving as a bearing fitting, is closed at its top by means of an end wall carrying a hook or eye 3 for the suspension of the sleeve from a ceiling or the like. The lower part of the sleeve is partially closed by an end wall 4 provided with a central bore 5. Enclosed in the sleeve 1 is a permanent magnet 6, which may also be substituted by a suitable electromagnet. The magnet 6 attracts at its lower part a hemisphere 7 of magnetic material, which may also be joined to the magnet 6. In the embodiment shown the magnet 6 and hemisphere 7 are located in the sleeve 1 and magnetically attract a ball 8 of magnetic material or another attractable material or similar body provided with convex surfaces. Fixed to the ball 8 is a load supporting member 9, for example, a wire, strip, shaft or the like of desired length adapted to suspend a load (not shown). As will be evident from the figure the main bearing arrangement presents two mutually turnable members, i.e. on the one hand the hemisphere 7 and on the other the ball 8. It will be evident that these two mutually turnable members engage each other with convex surfaces which results in the ball 8, due to its own weight, and also to the weight of the load taking up the lowermost position on the convex surface of the body 7, in which position the ball 8 is unbalanced but steadily takes up and maintains a substantially fixed centre of rotation. If, namely, either of the surfaces have a plane or concave shape there is a risk encountered that the centre of rotation will be indefinite and that the ball will be moved between different centres of rotation contributing to the increasing of the bearing friction which the invention has for its purpose to decrease as far as possible.

FIGURE 2 shows a modification of the arrangement shown in FIGURE 1 wherein the same reference numerals are used to designate the same details. The only difference in comparison with FIGURE 1 consists in that the hemisphere 7 in this case is substituted by a whole ball 10. This arrangement may sometimes be preferred if one desires to save the work splitting a ball such as in FIGURE 1 or if the restricted length of the bearing is unimportant.

From the embodiment shown in FIGURES 1 and 2 it will be evident that the lower wall 4 serves as a latching member for at least the ball 8 if, such an excessive load is imparted to the wire or shaft 9 that the magnetic force would not be able to retain the ball in its bearing position. The ball 8 may then only drop down onto the wall 4 which will hold it effectively. In certain applications it may be suitable to dispose the latching member so closely beneath the ball 8 that, after the load has reverted to one normal for the bearing the magnetic force will automatically draw the ball 8 back into its bearing position. In certain cases it may also be suitable in accordance with FIGURES 1 and 2 to place said latching member or members at such a distance that one may intentionally draw the ball out of its bearing position letting it rest against the latching member or members whereby the function of the bearing will cease. Although only two mutually turnable members attracting each other are shown in the drawing it is to be understood that each desired number of such members may be placed close to each other and kept together by magnetic attractive forces.

Due to the extraordinary absence of friction which may be obtained by the anti-friction bearing of the kind represented by the embodiments according to FIGURES 1 and 2 this bearing has wide possibilities of use and as an example FIGURE 3 illustrates in a perspective view a publicity display arrangement suspended from an anti-friction bearing which is generally designated by 11. On the depending wire or load supporting member 9 in an artistic or publicity technical way different projecting members, for example, sign-boards, sheets, placards or the like display devices 12 may be attached, which, for example are provided with an informative text regarding different sorts of goods. As will be evident from FIGURE 2 these sign-boards, sheets, placards or the like display devices 12 are arranged as blades or wings around the shaft 9 and the whole arrangement due to the lack of friction of the bearing can be rotated by means of a very weak ascending air-stream impinging on the sheets or placards 12. Such an air-stream may for instance be provided by the heat of the hand or by an incandescent lamp applied below the sheets 12. A disc 13 may also bear a text or for example, be provided with light reflecting material.

Although the arrangement according to FIGURE 3 is substantially described as constituting a publicity display arrangement it will be apparent that the arrangement can be modified in such a way, that it will form a rotatable lighting fitting.

A field wherein anti-friction bearings of the kind described are advantageously applied is particularly within the technics of apparatus and measuring apparatus, wherein it is required to mount a rotatable shaft with as little friction as possible. FIGURE 4 shows as an example an arrangement using two bearings according to the modification of FIGURE 2 wherein the same reference numerals indicate the same details as in said FIGURE 2. In this case the bearings are arranged horizontally which is not limiting for the invention since the bearing arrangement may assume each desired inclination in relation to the horizontal plane. Both balls 8 are in this case joined by a relatively rigid shaft 14, which is arranged to rotate in the direction of the arrow A while being supported by the magnetic forces between the respective balls 8 and 10. In the figure the distance B indicates the exact distance between adjacent points on each of the balls 10 in the different bearings and the distance C a suitable distance slightly less than the former one the difference suitably amounting to hundredths or thousandths of a millimetre in order to avoid jamming and the resulting increased friction between the balls 8 and 10 on the respective sides of the shaft 14. Under the presumption that the shaft 17 is not loaded by instrument elements of an excessive weight this bearing arrangement has the ability to support them in a rotatable way with the least possible resistance against rotation. The centering between the mutually turnable members of each bearing is no longer any problem due to the fact that said turnable members face each other with convex surfaces.

The shafts 9 and 19 may be provided with suitable turbines, propellers, wings or the like to be driven either by positively created streams or by air-flows caused by sources of heat having a very small capacity.

The invention is not limited to the embodiments shown and described but may be varied in several ways, for example, it is not necessary that the mutually turnable members may have an exact spherical shape as shown in the drawings, but it is essential that the turnable members have convex surfaces and mutually attract each other.

What I claim is:

An anti-friction bearing, comprising a vertically disposed housing having an aperture in the lower end thereof; a magnet disposed within said housing, the pole shoe of which is of a spherical shape and spaced from the lower end of said housing; a ball of greater size than said aperture magnetically engaging the lowermost portion of said pole shoe; and a load bearing shaft attached to said ball and extending outward through said aperture, said ball being spaced from the lower end of the housing a predetermined distance to enable the ball to be magnetically attached back to the pole shoe after being displaced therefrom due to an excessive load.

References Cited by the Examiner

UNITED STATES PATENTS

| 2,702,191 | 2/55 | Lemelson | 46—242 |
| 2,856,239 | 10/58 | Dacus | 308—10 |
| 2,939,245 | 6/60 | Orel | 46—241 |

FOREIGN PATENTS

| 856,396 | 11/52 | Germany. |
| 739,979 | 11/55 | Great Britain. |

OTHER REFERENCES

IBM Technical Disclosure Bulletin, vol. 3, No. 1, June 1960.

ORIS L. RADER, *Primary Examiner*.

MILTON O. HIRSHFIELD, *Examiner*.